United States Patent Office 3,252,826
Patented May 24, 1966

3,252,826
COATED THERMOPLASTIC TRANSPARENT ARTICLE
Carl B. Salzinger, Mayfield Heights, Ohio, assignor to The Dow Chemical Company, Midland, Mich., a corporation of Delaware
No Drawing. Filed Sept. 10, 1962, Ser. No. 222,683
11 Claims. (Cl. 117—138.8)

This application is a continuation-in-part of U.S. Serial No. 205,085, filed June 25, 1962, now abandoned.

This invention relates to resinous hydrophobic shaped articles having improved surface characteristics. It more particularly relates to articles of manufacture comprising a resinous hydrophobic polymeric shaped article such as film or sheet having on at least one of its surfaces a coating to provide improved surface characteristics.

Many resinous hydrophobic polymers, particularly those of a thermoplastic nature, because of their transparency and clarity, have use in the fields of packaging and decoration, as well as many utilitarian uses wherein the properties of transparency and clarity of surface are of great importance. Some of such applications are as windows in boxes, as clear envelopes for the protection of printed matter, as view ports and the like. However, the tendency of hydrophobic polymeric shaped articles to fog when exposed to high humidity conditions by the condensing of moisture in the form of small individual droplets on the surface of the film or sheet not only is unsightly, but renders the film opaque in appearance.

One of the characteristics of many synthetic resinous materials, particularly those of the thermoplastic nature, is a marked tendency toward scratching and scarring under relatively mild abrasive conditions. Such material has not been suitable for many applications because of this tendency to become defaced, or it has been employed in applications only where relatively mild abrasion or scratching conditions are expected to exist and the useful life of the article is relatively short.

It is an object of this invention to provide an improved thermoplastic resinous hydrophobic shaped article which has improved scratch resistance.

It is a principal object of this invention to provide a thermoplastic resinous shaped article having an anti-fogging surface.

A further object of the invention is to provide a non-tacky, non-blocking film with good slip characteristics and high scratch resistance.

According to the invention, resinous hydrophobic shaped articles such as film and sheet coated with a solution of a water soluble gum and the alkali metal salt of a fatty acid having from 12 carbon atoms to 22 carbon atoms in the acid chain have excellent clarity, good slip, good anti-block characteristics, high scratch resistance and maintain transparency under conditions of high humidity.

The transparent resinous hydrophobic shaped articles which may be employed in the practice of the invention may be prepared from an alkenyl aromatic resin. By an alkenyl aromatic resin is meant a solid polymer of one or more polymerizable alkenyl aromatic compounds. The polymer or copolymer comprises, in chemically combined form, at least 50 percent by weight of at least one alkenyl aromatic compound having the general formula:

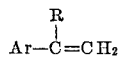

wherein "Ar" represents an aromatic hydrocarbon radical, or an aromatic halohydrocarbon radical of the benzene series, and "R" is hydrogen or the methyl radical. Examples of such alkenyl aromatic resins are the solid homopolymers of styrene, alpha-methylstyrene, ortho-methylstyrene, meta-methylstyrene, para-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methyl methacrylate, or acrylonitrile, etc. The polyolefins, such as polyethylene, polypropylene and copolymers of ethylene and propylene are eminently suited for the practice of the invention. Treatment in accordance with the invention is also effective on polyester resins such as polyethylene terephthalate. It is to be understood, however, that the present invention also comprehends shaped articles and films of any synthetic linear polyester prepared by reacting terephthalic acid, dialkyl terephthalates, or ester-forming derivatives thereof with a glycol of the series $HO(CH_2)_nOH$, where "$n$" is a whole number within the range of 2–10. They may also include up to 20 percent by weight of a second acid or ester thereof, said second acid being selected from the group consisting of isophthalic acid, dibenzoic acid, hexahydro-terephthalic acid, adipic acid, sebacic acid, azelaic acid, naphthalic acid, 2,5-dimethyl terephthalic acid, and bis-p-carboxyphenoxy ethane. The practice of the invention is also successful with other thermoplastic resinous materials well known to the art, including those which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose, and the like. Other hydrophobic thermoplastic resins which are beneficially treated by the present anti-fogging method are: chlorinate polyolefins, such as chlorinated polyethylene, chlorinated polypropylene, and the like, as well as saran resins, which include thermoplastic copolymers of vinylidene chloride with one or more such monomers as vinyl chloride, acrylates and esters such as ethyl acrylate, propylate, and the like.

A wide variety of water-soluble gums may be employed in the practice of the invention including such materials as guar gum, polyvinyl alcohol, hydroxy ethyl cellulose, carboxy methyl cellulose, agar, and the like. It is essential that the gum be substantially water-soluble under the conditions of use which limits to some extent the variety of materials which are employed.

Particularly beneficial and advantageous are methyl celluloses which include water-soluble cellulose ethers comprised of units of the empirical formula:

wherein G represents the anhydroglucose unit of the cellulose molecule, R is selected from the group consisting of methoxyl and methylmethoxyl, and R' is selected from the group consisting of hydroxyethyl, hydroxypropoxy, carboxymethyl, hydroxybutyl, with the further limitation that R can be only methylmethoxyl when R' is hydroxyethyl.

The above methyl cellulose materials exhibit sufficient surface activity to permit wetting of the aromatic substrate and exhibit the claimed anti-fogging and anti-static properties.

For example, a commercial product, Methocel 60 HG, has been found to be quite satisfactory for use as the coating composition.

"Methocel" 60 HG is the trade name for hydroxypropyl methyl cellulose (the mixed methyl and hydroxypropyl ether of cellulose) having a methoxyl content of from 28 to 30 percent and a hydroxypropoxyl content of from 7 to 12 percent. It is prepared by reacting methyl cellulose with caustic soda and then with propylene oxide.

"Methocel" 60 HG in aqueous solution has the following properties:

Surface tension _____ 44–50 dynes/cm. (25° C.).
Interfacial tension (Paraffin oil) _____ 18–19 dynes/cm. (25° C.).
pH _____ Neutral.
Solution stability _____ Stable from pH 2 to pH 12 at 20° C.
Specific gravity 20°/4° C.:
   1 percent _____ 1.0012.
   5 percent _____ 1.0117.
   10 percent _____ 1.0245.

The coating compositions are prepared by dissolving the gum in water; generally this can be done simply by admixing the gum and water and allowing to stand until homogeneous solution is obtained. Advantageously, agitation will considerably accelerate the rate of solution.

The alkali metal salts used in the present invention may be substantially pure. However, from an economic standpoint, technical grades which contain customary contaminants are successfully employed in the practice of the invention. All alkali metal salts of fatty acids containing from 12 to 22 carbon atoms are beneficially employed in the practice of the invention. The water-soluble gum and alkali metal salt generally are utilized in proportions from about 1:9 to about 9:1 and, beneficially, from about 1 to 3 parts of water-soluble gum to 1 part of metal salt.

A suitable dispersing medium for the metal salts and water-soluble gums for application to the surfaces of resinous substrates is water, which is particularly advantageous because of its ready availability and low cost. However, other materials such as alcohols, methyl alcohol, ethyl alcohol, propyl alcohol, butyl alcohol, and the like are readily employed. To increase the solubility of the metal salts and water-soluble gums in water, frequently it is desirable to employ as a dispersing medium a mixture of water and alcohol. Advantageously, such materials as nitromethane and the like vehicles for applying the salt and water-soluble gum coatings allow ready evaporation of the medium without the application of excessive heat. Beneficially, the concentration of the salt and water-soluble gum in the dispersing medium is often adjusted within its limits of solubility to conform to the particular method of coating application which is being utilized; however, if it is not soluble, a dispersion of the salt and water-soluble gum is also satisfactory. The dispersion of metal salt and water-soluble gum is readily applied to the surfaces of articles by spraying, dipping, rolling, brushing, and like methods.

Since only small proportions of the composition are required to produce a continuous coating or layer of the composition on the surfaces of the film or sheet and are effective in maintaining the resinous sheet transparent, the ingredients of the composition are mixed together in the liquid medium in the desired proportions in a total concentration of at least 0.1 percent, suitably from 0.1 to 10 percent by weight of the liquid dispersion or solution. Such dispersion or solution of the ingredients of the anti-fogging composition is applied to the surfaces of the sheet or film by brushing, dipping, spraying, roller coating or by doctor blade.

Beneficially, there should be deposited upon the resinous substrate a dried coating weight of about 0.1 to 5 milligrams per square foot of surface and preferably from about 1.0 to 2.0 milligrams per square foot of surface. Surface coating weights lower than about .1 milligram per square foot are oftentimes difficult to deposit from water and usually do not provide the desired surface characteristics due to poor wetting of the surface during coating and/or insufficient material is deposited on the surface of the substrate. Above a coating weight of 5 milligrams per square foot there appears to be no advantage gained and the surface properties are not significantly improved. Polymeric sheets having excellent surface characteristics are obtained when the dry coating is from about 25 to about 500 Angstroms in thickness. For most applications, a coating thickness of from about 50 to 100 Angstroms is beneficially employed.

With certain salt-gum solutions or dispersions it is often beneficial to pretreat the surface of the resin to enhance the wettability. This is readily accomplished by various treatments well known in the art for decreasing the hydrophobic character of the sheet. Typical treatments include oxidation by acids and the like. Particularly beneficial for treatment of resinous sheet used in the practice of the invention are the corona discharge treatments used for polyethylene and like materials to enhance their printability and ink acceptance. Resinous sheet, when treated in a similar manner, is readily coated with dispersions or solutions of gums and metal salts of aliphatic acids to give a smooth uniform layer. Employing conventional coating apparatus, the coating weight is readily controlled by the thickness of the coating material applied to the sheet in such a manner that the desired quantity is readily obtained and a minimum of the liquid medium is to be evaporated. Oriented resinous sheets in accordance with the invention which are coated with a liquid dispersion of a gum and salt of an aliphatic acid in a volatile solvent or dispersing agent are readily dried to form a coating by exposure to air, heated air, infrared radiation, and the like conventional drying means.

Particularly beneficial is the use of methyl cellulose and sodium oleate for the coating of alkenyl aromatic resinous articles and particularly thin film or sheet prepared from polystyrene. The coatings in accordance with the invention produce an extremely clear, transparent surface which exhibits excellent resistance to scratching, blocking and forging. Also, they impart very desirable slip characteristics to the treated sheets.

*Example I*

Various solutions of water-soluble gums and alkali metal salts are prepared which result in a treating solution having 0.2 percent by weight of the coating being evaluated in deionized water. The solutions are evaluated by coating on one mil thick polystyrene film, by means of a wire-wound rod, a wet coating approximately a quarter of a mil thick. This aqueous coating is then dried at about 80° centigrade, to leave a coating of the surface active agent weighing approximately 1.2 milligrams per square foot on the surface of the polystyrene film. Portions of the coated polystyrene film were tested for fogging by securing the film, coated side down, with a rubber band over the top of a 32 ounce glass jar containing about 6 ounces of water at 25°. The jar was placed in a refrigerator for 2 minutes, then was removed and examined for fogging. Scratch resistance is determined by rubbing coated sheets against each other under a pressure of 1 pound per square inch for 20 oscillations and separately by passing a thumbnail across and in contact with the surface being evaluated. The broad outer surface of the nail forms an angle of about 45° with the sheet being tested and is drawn across the surface in the direction generally indicated by a line normal to and away from the exposed major surface of the nail. Clarity is evaluated by inspection. Slip is evaluated by manually sliding a coated surface to be evaluated over a like surface and noting the apparent resistance to movement.

The results are set forth in Table I.

TABLE I

| Gum | Parts | Salt | Parts | Anti-Fog Properties | Clarity | Scratch Resistance | Slip | Blocking at 60° C. |
|---|---|---|---|---|---|---|---|---|
| Methyl cellulose, 10 cps | 2 | Sodium oleate | 1 | Excellent | Excellent | Excellent | Excellent | None. |
| Do | 3 | do | 1 | do | do | do | do | Do. |
| Methyl cellulose, 25 cps | 1 | do | 1 | do | do | do | do | Do. |
| Hydroxypropoxy methyl cellulose, 100 cps | 2 | Potassium laurate.[1] | 1 | do | do | do | do | Do. |
| Methyl cellulose, 50 cps | 8 | Sodium oleate | 1 | do | do | Fair | Fair | Do. |
| Methyl cellulose, 4,000 cps | 1 | do | 7 | Very good | do | do | Excellent | Do. |
| Polyvinyl alcohol, 90 percent hydrolyzed | 4 | do | 1 | do | do | do | Good | Do. |
| Do | 2 | Potassium oleate | 1 | Good | do | Excellent | Excellent | Do. |
| Do | 3 | | 1 | do | do | do | do | Do. |
| Sodium carboxy methyl cellulose | 1 | Sodium oleate | 1 | do | do | do | do | Do. |
| Do | 1.5 | do | 1 | do | do | do | do | Do. |
| Hydroxypropoxy methyl cellulose, 200 cps | 2 | Sodium salt of behenic acid.[1] | 1 | do | do | do | do | Do. |
| Hydroxyethyl cellulose, 3,000 cps | 2 | Sodium oleate | 1 | do | do | do | do | Do. |
| Hydroxyethyl cellulose, 15,000 cps | 2 | do | 1 | Excellent | do | do | do | Do. |

[1] Heated to 60° C. and applied hot.

*Example II*

The procedure of Example I was repeated, with the exception that the oriented polystyrene film was replaced with polyethylene film. Substantially similar results were obtained.

*Example III*

The procedure of Example I was repeated, with the exception that the polystyrene film was replaced with polypropylene film. Substantially similar results were obtained.

*Example IV*

The procedure of Example I was repeated, with the exception that the polystyrene film was replaced with polyvinyl chloride film. Substantially similar results were obtained.

*Example V*

The procedure of Example I was repeated, with the exception that the polystyrene film was replaced with saran film. Substantially similar results were obtained.

*Example VI*

The procedure of Example I was repeated, with the exception that the polystyrene film was replaced with cellulose acetate film. Substantially similar results were obtained.

*Example VII*

The procedure of Example I was repeated, with the exception that the polystyrene film was replaced with polyethylene terephthalate film. Substantially similar results were obtained.

*Example VIII*

The procedure of Example I was repeated, with the exception that the polystyrene film was replaced with saran coated cellophane film. Substantially similar results were obtained.

As is apparent from the foregoing specification, the article and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An article of manufacture comprising a shaped transparent article prepared from synthetic resinous material having a coating on at least one surface, said coating consisting essentially of a mixture of water-soluble gum selected from the group consisting of water-soluble cellulose ethers, and polyvinyl alcohol and an alkali metal salt of a fatty acid having from 12 to 22 carbon atoms wherein the gum and the salt are present in a ratio of from about 1 to about 9 to about 9 to about 1.

2. The article of manufacture of claim 1, wherein said shaped article is a film.

3. The article of manufacture of claim 1, wherein said resinous material is selected from the group consisting of alkenyl aromatic resins, saran resins, cellulose esters, polyester resins, polyolefin resins and polyvinyl chloride resins.

4. The article of manufacture of claim 1, wherein said resinous material is an alkenyl aromatic resin.

5. The article of claim 1, wherein said alkenyl aromatic resin is polystyrene.

6. The article of manufacture of claim 4, wherein said water-soluble gum is a methyl cellulose.

7. The article of claim 1, wherein said coating comprises methyl cellulose and sodium oleate.

8. The article of claim 7, wherein the ratio of methyl cellulose to sodium oleate is from about 1:1 to about 2:1.

9. The article of claim 1, wherein said resinous shaped article is transparent.

10. A transparent thermoplastic synthetic resinous packaging film comprising an oriented alkenyl aromatic resinous film which comprises in chemically combined form at least 50 percent by weight of at least one alkenyl aromatic compound having the general formula:

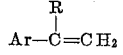

wherein Ar represents an aromatic hydrocarbon radical of the benzene series, R is selected from the group consisting of hydrogen and methyl and having a coating on at least one surface, the coating consisting essentially of a mixture of from about 1-3 parts by weight of cellulose ethers having the formula:

wherein G represents the anhydroglucose unit of the cellulose molecule, R is selected from the group consisting of methoxyl and methylmethoxyl, and R' is selected from the group consisting of hydroxyethyl, hydroxypropoxy, carboxymethyl, hydroxybutyl, with the further limitation that R can be only methylmethoxyl when R' is hydroxyethyl, and 1 part by weight of an alkali metal salt of a fatty acid containing from 12-22 carbon atoms, the coating being present as a continuous coating having a thickness of between about 50 and 500 Angstroms.

11. The article of claim 1, wherein the synthetic resin is polystyrene, the water-soluble gum is methyl cellulose and the alkali metal salt is sodium oleate.

References Cited by the Examiner

UNITED STATES PATENTS

| | | | |
|---|---|---|---|
| 2,235,516 | 3/1941 | Cornwell | 106—171 |
| 2,416,051 | 2/1947 | Gilbert | 117—165 X |
| 2,772,172 | 11/1956 | Carson | 260—735 X |
| 2,979,410 | 4/1961 | Parlour | 117—138.5 X |
| 2,979,417 | 4/1961 | Kruger et al. | |
| 3,039,895 | 6/1962 | Yuk | 117—167 X |
| 3,044,898 | 7/1962 | Habib | 117—76 |
| 3,099,350 | 7/1963 | Hammond | 117—166 X |

WILLIAM D. MARTIN, *Primary Examiner.*

RICHARD D. NEVIUS, *Examiner.*

C. A. HAASE, T. G. DAVIS, *Assistant Examiners.*